(12) United States Patent
Couvée et al.

(10) Patent No.: US 6,282,112 B1
(45) Date of Patent: Aug. 28, 2001

(54) NETWORK STORAGE SYSTEM

(75) Inventors: Philippe Couvée, Villard-Bonnot; Jean-François Chalard, Froges, both of (FR)

(73) Assignee: Bull S.A., Louveciennes (FR)

( * ) Notice: Subject to any disclaimer, the term of this patent is extended or adjusted under 35 U.S.C. 154(b) by 0 days.

(21) Appl. No.: 09/624,349

(22) Filed: Jul. 24, 2000

(30) Foreign Application Priority Data

Jul. 22, 1999 (FR) .................................................. 99 09544

(51) Int. Cl.$^7$ ...................................................... G11C 5/02

(52) U.S. Cl. .................................................................... 365/52

(58) Field of Search ................................. 365/51, 52, 63; 382/100, 181

(56) References Cited

U.S. PATENT DOCUMENTS 5,809,167 * 9/1998 Al-Hussein ............................ 382/181
5,832,100 * 11/1998 Lawton et al. ........................ 382/100

FOREIGN PATENT DOCUMENTS 0 405 861   1/1991   (EP) .
0 795 823   9/1997   (EP) .
0 932 096   7/1999   (EP) .

OTHER PUBLICATIONS

David A. Deming: "the SCSI Tutor: an in–Dept Exploration of the Small Computer System Interface" Endl Pubs, Saratoga, CA: USa XP002137576: p. 5–9, Kube 1– final line.
Andert G: "Object Frameworks in the Taligent OS" Proceedings of the Psring Computer Sociiety Int'l Conf. (Compcon) US, Los Alamitos, IEEE Comp. Soc. Press, vol. –, 1994, pp. 112–121, XP000479386, ISBN: 0–8186–5380–9—p. 118, paragraph 3.

* cited by examiner

Primary Examiner—Trong Phan
(74) Attorney, Agent, or Firm—Miles & Stockbridge P.C.; Edward J. Kondracki

(57) ABSTRACT

A network recognition system for identifying a storage unit of a plurality of network storage subsystems of a machine (1) including at least one local coupler (11) for exchanging data with the storage subsystems (5, 6, 7) of the network recognition system, each storage subsystem (5, 6, 7) having at least one storage unit identifiable by means of a logical unit number (LUN). An object (100) corresponding to the machine (1) has an object (101) corresponding to the local coupler (11) of the machine (1). Object (101) includes an object (111) corresponding to a remote coupler (51, 52) of one of the storage subsystems (5). Object (101) includes a method (116) for obtaining the object (111) and a list of objects (118, 119) each corresponding to a logical unit number (LUN) identifying a storage unit of the subsystem (5) accessible through the local coupler (11).

9 Claims, 3 Drawing Sheets

NETWORK STORAGE SYSTEM

FIELD OF THE INVENTION

The field of the invention is the mass storage of information fully or partially shared by several data processing machines.

A network storage system comprises several storage subsystems accessible by means of a network constituted by fabrics and loops. A storage subsystem comprises storage units constituted by recordable media such as magnetic tapes, magnetic disks or rewritable optical disks.

Each storage unit is identified by a logical unit number (LUN) in order to allow the machines connected to the network to access the storage units. To access a storage unit, a machine sends a message addressed with the logical unit number to an input/output coupler connected to the network. The network routes the message to an input/output coupler of the storage subsystem containing the storage unit identified by the logical unit number.

The network storage system provides flexibility and economy in the daily management by system administrators. However, it has the drawback of making visible, to any machine connected to the network, the storage units used by the other machines. This results in problems in protecting the data from human or hardware errors such as, for example, an accidental erasure.

One possible solution is to verify, in each storage subsystem, the access rights to its storage units of the machines connected to the network. However, this requires at least a double checking of the access rights, both in the storage subsystems and in each machine, in order to prevent unsuccessful access attempts. Moreover, a standard business storage subsystem does not necessarily have the functionalities for performing access controls.

Another solution consists of configuring a machine so that its operating system knows only the logical unit numbers that identify the storage units that this machine is authorized to access. This requires providing the capability to reconfigure the machine without shutting it down when wishing to add a resource such as an additional storage unit. When all the storage units of a storage subsystem are unknown to the machine, the machine has no access path to this storage subsystem through the network. This makes it difficult to make available to the machine a storage unit belonging to a storage subsystem unknown to the machine.

SUMMARY OF THE INVENTION

In order to eliminate the above-mentioned drawbacks of the prior art, the invention proposes an object corresponding to a machine that comprises at least one local coupler for exchanging data with storage subsystems of a network storage system, each storage subsystem comprising at least one storage unit identifiable by means of a logical unit number, the object corresponding to the machine comprising an object corresponding to the local coupler of the machine, characterized in that the object corresponding to the local coupler comprises an object corresponding to a remote coupler of one of the storage subsystems and in that the object corresponding to the local coupler comprises a method for obtaining the object corresponding to the remote coupler, a list of objects each corresponding to a logical unit number identifying a storage unit of the storage subsystem accessible through the local coupler.

Thus, even if the list of objects, each corresponding to a logical unit number identifying a storage unit of the storage subsystem accessible through the local coupler, is empty, the object corresponding to the remote coupler allows the object corresponding to the local coupler to obtain, by means of said method, an object corresponding to a logical unit number identifying a storage unit to be added to this list.

BRIEF DESCRIPTION OF THE DRAWING

The description of a particular implementation of the invention follows, in reference to the figures, in which.

DESCRIPTION OF THE PREFERRED EMBODIMENT

Figure 1:
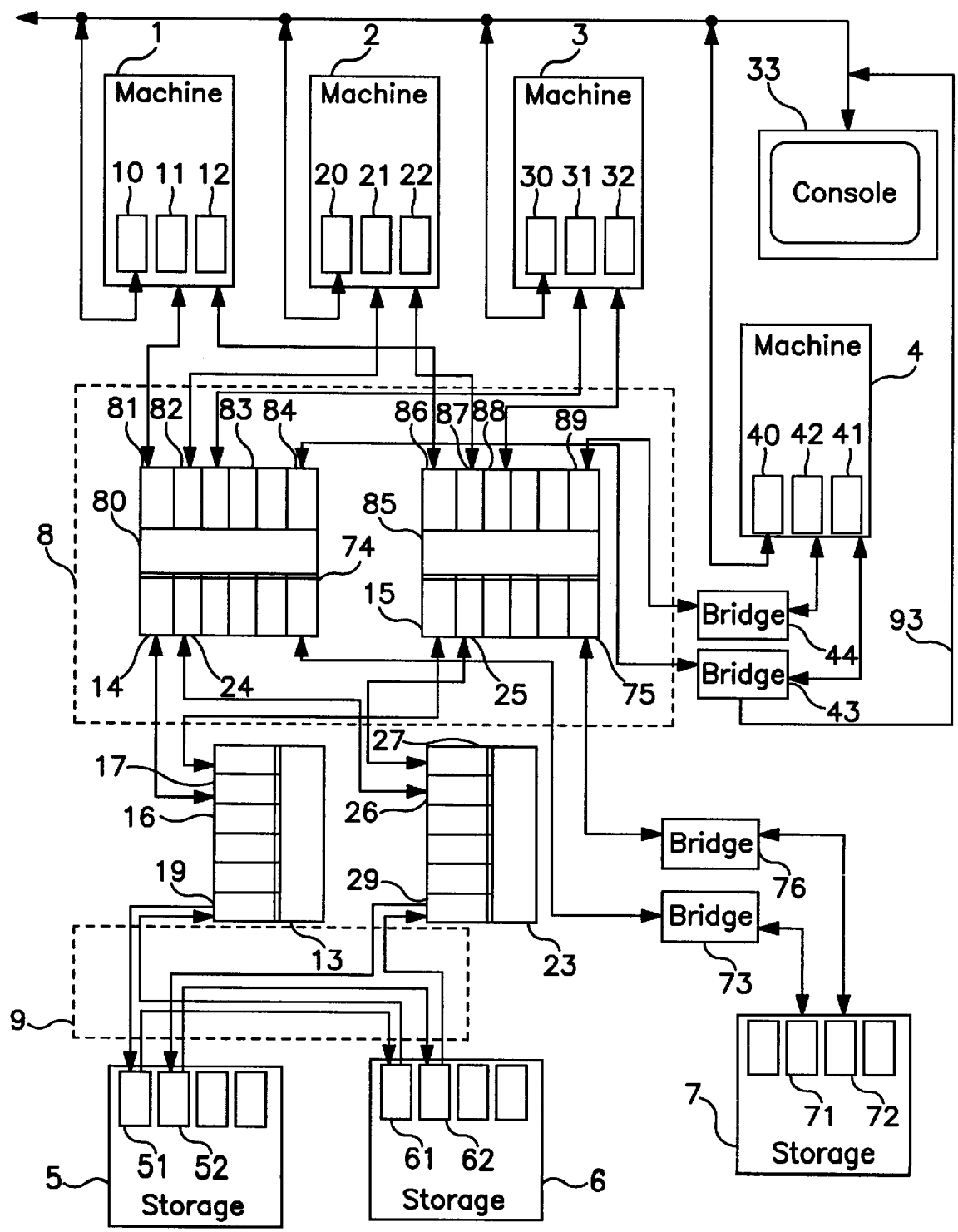
FIG. 1 represents a storage device shared by several machines.

Referring to FIG. 1, a network storage system is provided for various machines 1, 2, 3, 4. The storage system comprises various storage subsystems 5, 6, 7. The storage system comprises one or more reticular networks called fabrics 8, and one or more loop networks called loops 9.

The machine 1 exchanges data with the storage system by means of couplers 11, 12. The machine 2 exchanges data with the storage system by means of couplers 21, 22. The machine 3 exchanges data with the storage system by means of couplers 31, 32. The machine 4 exchanges data with the storage system by means of couplers 41, 42.

A switch 80 comprises couplers 14, 24, 74, 81, 82, 83, 84. A switch 85 comprises couplers 15, 25, 75, 86, 87, 88, 89. A hub 13 comprises couplers 16, 17, 19. A hub 23 comprises couplers 26, 27, 29.

The fabric 8 is constituted by the switches 80, 85 and a two-way physical link of the coupler 11 to the coupler 81, a two-way physical link of the coupler 21 to the coupler 82, a two-way physical link of the coupler 31 to the coupler 83, a two-way physical link of a bridge 43 to the coupler 84, a two-way physical link of the coupler 12 to the coupler 86, a two-way physical link of the coupler 22 to the coupler 87, a two-way physical link of the coupler 32 to the coupler 88, a two-way physical link of a bridge 44 to the coupler 89, a two-way physical link of the coupler 14 to the coupler 16, a two-way physical link of the coupler 24 to the coupler 26, a two-way physical link of the coupler 74 to a bridge 73, a two-way physical link of the coupler 15 to the coupler 17, a two-way physical link of the coupler 25 to the coupler 27, a two-way physical link of the coupler 75 to a bridge 76.

The switch 80 with its two-way physical links and the switch 85 with its two way physical links provide a redundancy of possible paths for transmitting data in the fabric 8 in case a path is unavailable.

The subsystem 5 exchanges data for the storage system by means of couplers 51, 52. The subsystem 6 exchanges data for the storage system by means of couplers 61, 62. The subsystem 7 exchanges data for the storage system by means of couplers 71, 72.

The loop 9 is constituted by the hubs 13, 23 and a one-way physical link from the coupler 19 to the coupler 61, a one-way physical link from the coupler 51 to the coupler 61, a one-way physical link from the coupler 61 to the coupler 19, a one-way physical link from the coupler 29 to the coupler 52, a one-way physical link from the coupler 52 to the coupler 62, a one-way physical link from the coupler 62 to the coupler 29.

The hub 13 with its one-way physical links and the hub 23 with its one-way physical links provide a redundancy of possible paths for transmitting data in the loop 9 in case a path is unavailable.

In order for these machines to access the storage subsystems through the fabric 8 and the loop 9 with performance levels comparable to those of an input/output bus, the technology for transmitting the data through the physical links described above prevents data losses in case of network congestion. Control of the data flow is achieved through known transmission authorization credit techniques, as with input/output channels. The transmission technology is also compatible with network protocols that are desirable for use in the fabric 8 or the loop 9. One example of a currently available technology is the one known by the name FiberChannel, an ANSI standard (American National Standards Institute).

The bridges 43 and 44 perform an adaptation of the transmission technology in the fabric 8 to a different transmission technology in the couplers 41, 42. The bridges 73 and 76 perform an adaptation of the transmission technology in the fabric 8 to a different transmission technology in the couplers 71, 72. A two-way link between the coupler 41 and the bridge 43, a two-way link between the coupler 42 and the bridge 44, a two-way link between the coupler 71 and the bridge 73, a two-way link between the coupler 72 and the bridge 76 are like input/output channels in, for example, SCSI (Small Computer System Interface) transmission technology, a currently available standard.

A console 33 makes it possible to control the accessibility of the storage system from the machines 1, 2, 3, 4 through a bus connected to the machine 1 by a coupler 10, to the machine 2 by a coupler 20, to the machine 2 by a coupler 30, to the machine 4 by a coupler 40. The concept of a bus should be taken in the broad sense, and can be a network using the known protocol TCP/IP.

Each of the machines 1, 2, 3, 4 has an operating system (OS) for running applications by means of the physical and software resources at its disposal. Each resource available to the operating system corresponds to a virtual object, defined in a hierarchical structure as explained herein in reference to FIG. 2.

At the top of the hierarchical structure is an object 100, which corresponds to a machine. The object 100 is composed of objects 101, 102, 103 and methods 104, 105, 106, 107 whose actions on the objects 101, 102, 103 determine a behavior of the object 100. The objects 101, 102, 103 that compose the object 100 constitute son objects of the object 100, which therefore constitutes a father object of these son objects.

The object 102 is composed of objects 121, 122 and methods 124, 125, 126 whose actions on the objects 121, 122 determine a behavior of the object 102. The objects 121, 122 that compose the object 102 constitute son objects of the object 102, which therefore constitutes a father object of these son objects.

The object 121 is composed of objects 123, 127 and methods 128, 129 whose actions on the objects 123, 127 determine a behavior of the object 121. The objects 123, 127 that compose the object 121 constitute son objects of the object 121, which therefore constitutes a father object of these son objects.

The structure is hierarchical in that these objects 123, 127 constitute son objects of the object 121, the object 121 constitutes a father object for the objects 123, 127 and a son object for the object 102, and the object 102 constitutes a father object for the objects 121, 122 and a son object for the object 100.

When the object 100 corresponds to the machine 1, the object 103 corresponds for example to a hardware resource such as a microprocessor of the machine 1. The object 103 has several son objects 131, 132. The object 131 corresponds to a level 1 cache memory of the microprocessor. The object 132 corresponds to an arithmetic and logic unit. A method 135 makes it possible to act on the object 131 in order to perform cache purges or produce cache coherency. The method 135 is accessible by a method 107 of the object 100 through an interface 133. A method 136 makes it possible to act on the object 132 in order to perform interrupts or other processor commands. The method 136 is accessible by a method 105 of the object 100 through the interface 133. The interface 133 comprises named data that determines the existence of the object 103 in the object 100. Among this data may be distinguished attributes such as an identification number, a microprocessor version number, or a physical location of the microprocessor in the machine 1, and method data such as the names of the methods 135, 136 with input and output values of the methods 135, 136, accessible to the methods 105, 107 of the object 100. A method 134 allows interactions between the object 131 and the object 132 for controlling data exchanges between arithmetic and logic unit registers and cache lines. As the method 134 does not communicate with the interface 133, it is not visible to the object 100.

Just as the objects 131, 132 correspond to physical components such as cache memories and arithmetic and logic units, the methods 134, 135, 136 fully or partially correspond to wired circuits or microprograms etched on silicon.

An interface 139 allows applicative objects, not represented, to use the object 100. Applicative objects correspond to programs executed by the machine 1. The methods 104, 105, 106, 107 constitute the operating system of the machine 1. The method 107 is, for example, a virtual addressing method accessible to the applicative objects through the interface 107.

Figure 2:
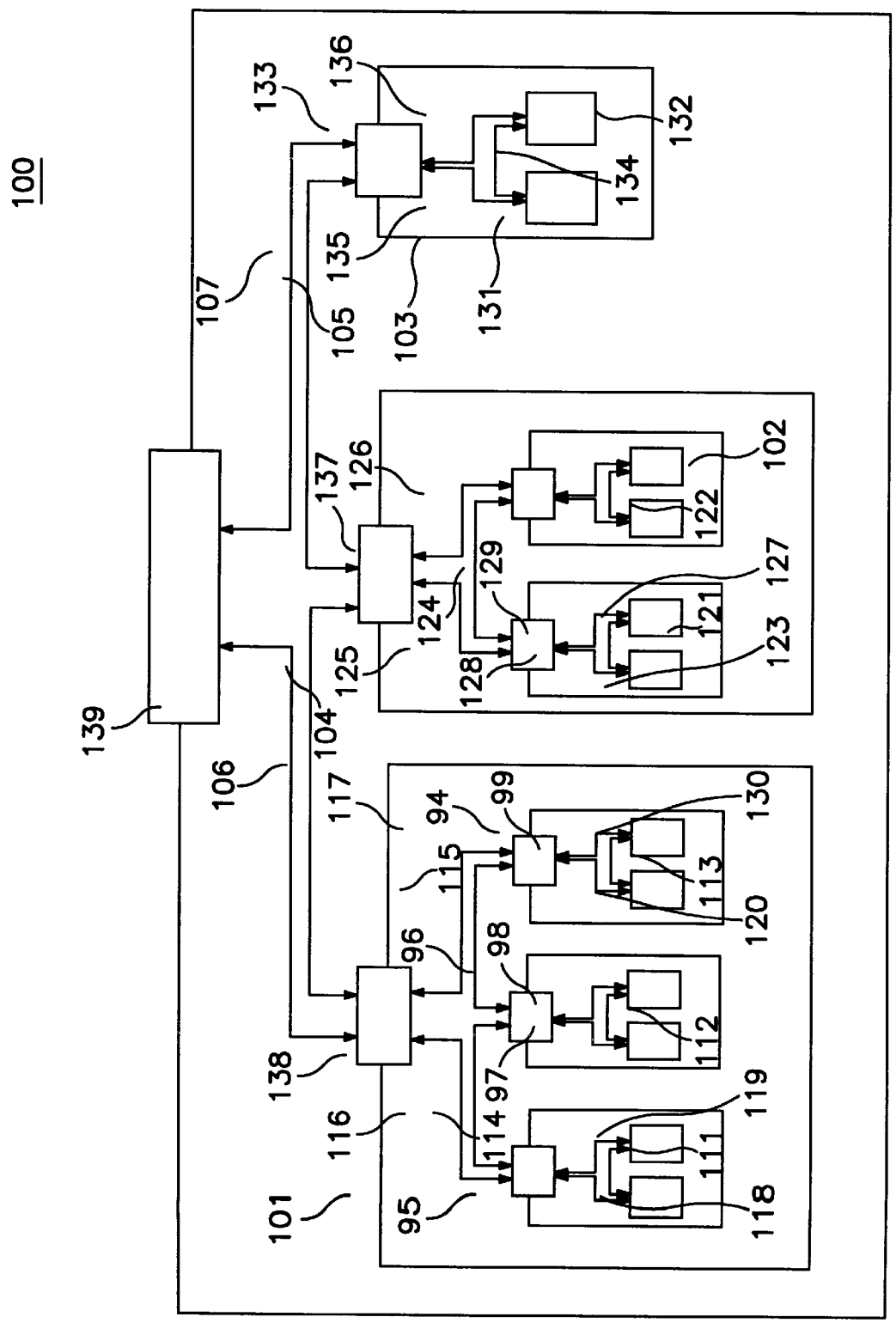
FIG. 2 represents an object corresponding to a machine of FIG. 1.

When the object 102 corresponds to a physical memory of the machine 1, the method 105 is a real addressing method that read- and write-accesses the physical memory through an interface 137. Without a method between the object 102 and the interface 137, the physical memory of the machine 1 is not visible to the applicative objects. For purposes of clarity, FIG. 2 is not an exhaustive representation of all of the objects corresponding to components of the machine 1. For example the method 105 can interact with an object, not represented, that Corresponds to a system bus of the machine 1.

The object 101 corresponds to a local coupler of the machine to which the object 100 corresponds. An interface 138 allows the object 100 to act on the object 101. The interface 138 comprises various attributes of the object 101, such as an identifier of the coupler 11 when the object 101 corresponds to the coupler 11 or an identifier of the coupler 12 when the object 101 corresponds to the coupler 12, a communication protocol of the corresponding coupler such as FiberChannel or SCSI, a physical location of the corresponding coupler in the machine.

According to one characteristic of the invention, the object 101 comprises objects 111, each corresponding to a remote coupler of one of the storage subsystems 5, 6, 7 accessible from the local coupler through the fabric 8 and/or the loop 9. According to the example of FIG. 1, there is an object like the object 111 for each remote coupler 51, 52, 61, 62, 71, 72.

The object 101 comprises an object 112 which corresponds to a network coupler to which the local coupler to which the object 101 corresponds is directly connected. When the object 101 corresponds to the coupler 11, the object 112 corresponds to the coupler 81. The object 112 makes available to the object 101, by means of an interface 96 and methods inside the object 112, identifiers of the fabrics and/or loops accessible through the coupler to which the object 112 corresponds, with a list of couplers of switches 80, 85, of network hubs 13, 23 and/or of remote couplers of a storage subsystem associated with each fabric and/or each loop. The obtainment of the object 112 will be explained in reference to FIG. 3.

The interface 138 comprises a list LRC (List of Remote Couplers) of the objects 111, 113 accessible to the object 100 by means of methods 116, 117. Initially, the list LRC is empty, and building methods 114, 115 make it possible to create the objects 111, 113 from the object 112, in order to add to the list LRC. Each object 111, 113 comprises all the data required to establish communications between the local coupler and the remote coupler to which they belong.

The object 111 comprises objects 118, 119, each corresponding to a logical unit number LUN that identifies a storage unit in the storage subsystem to which belongs the remote coupler to which the object 111 corresponds. For example, if the object 111 corresponds to the remote coupler 51, the object 118 corresponds to a logical unit number LUN that identifies a storage unit in the storage subsystem 5.

The object 111, which corresponds to the remote coupler 51, makes available to the object 101, through an interface 95, a list CLL of objects 118, 119, each corresponding to a logical number of the storage unit 5. Other objects like the object 111, not represented, which respectively correspond to the remote coupler 51, 61, 62, 71, 72, each make available to the object 101 a list CLL of logical numbers of the storage units 5, 6, 7.

The object 100 obtains the list CLL of objects 118, 119 from the object 111 by means of the interface 138 and the method 116. The method 116 can be parameterized to mask one or more objects of the list CLL. However, even if the list CLL as transmitted by the method 116 is empty, the object 111 continues to exist. The method 116 is therefore capable of providing a logical number of a storage unit as soon as it is unmasked, since it is available to the object 111.

Parameter values for parameterizing the method 116 are available, in the interface 138, to the method 106, which acts on these values. The method 106 is accessible through the interface 139 to a management application of the network storage system. The management application has a graphical interface on the console 33 that allows an administrator of the network storage system to set and modify said values so as to mask or unmask the logical numbers of storage units. The settings and the modifications generated in the console 33 are transmitted to the machine 1 through the coupler 10.

The preceding explanations for when the object 100 corresponds to the machine 1 are also valid when the object 100 corresponds to a machine 2, 3. The settings and the modifications of values generated in the console 33 to be sent to objects 100 representing the machines 2, 3 are transmitted to the machines 2, 3 by the couplers 20, 30, respectively.

When the object 100 corresponds to the machine 4, there is an object like the object 101 corresponding to the coupler 41 and an object like the object 101 corresponding to the coupler 42. The following explanations for the object 101 corresponding to the coupler 41 are also valid for the object 101 corresponding to the coupler 42.

The object 101 comprises an object 113 corresponding to the incoming bridge 43 to the storage system. The object 113 comprises objects 120, 130, each corresponding to a logical unit number LUN that identifies a storage unit in the storage system. The object 113 makes the objects 120, 130 available to the object 101 through an interface 94.

The object 100 obtains the list CLL of objects 120, 121 of the object 113 by means of the interface 138 and the method 117. The object 113 comprises at least one method 99 that can be parameterized to control the supplying of objects from the list CLL. Parameter values for parameterizing the method 99 are available through the bridge 43, respectively 44, so that the method 99 is not directly accessible to the object 101. The method 99 is accessible to the management application of the network storage system through a direct link 93 of the console 33 to the bridge 43. The graphical interface of the management application allows the administrator of the network storage system, through the console 33, to set and modify said values so as to control the supplying of logical numbers of storage units. In a variant, the settings and modifications generated in the console 33 are transmitted to the machine 4 through the coupler 40.

Figure 3:
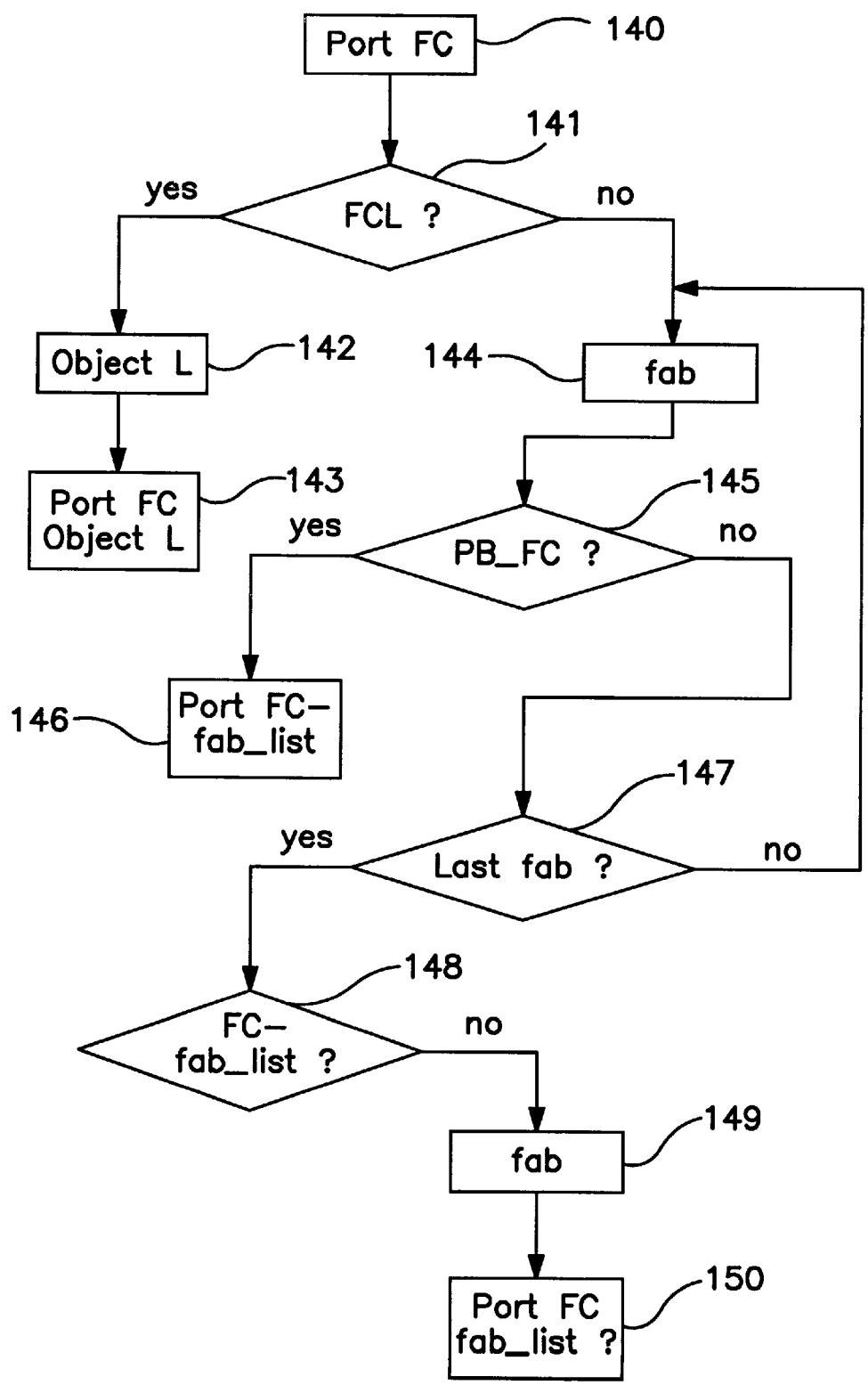
FIG. 3 represents a network recognition process.

FIG. 3 presents a process for obtaining the object 112.

For each local coupler 11, 12, 21, 22, 31, 32, 41, 42 connected to the network, the process activates a step 140 for recognizing this coupler as a port FC, during a respective configuration of the machine 1, 2, 3, 4.

A step 141 tests whether this coupler is connected to a private loop FCL. If the response is yes, the process activates a step 142, which creates a new object L corresponding to a private loop. A step 143 attaches the coupler to this loop, i.e., creates the object 112 with the identifier of this loop as an attribute. In the exemplary system described in reference to FIG. 1, there is no local coupler of a machine connected to a loop. However, one skilled in the art would have no trouble envisioning such machines, connected in a way similar to the way the storage subsystems 5, 6 are connected to the loop 9.

If the response is no, this means that the local coupler of the machine is connected to a fabric. In the example of FIG. 1, this is the case with the machines 1, 2, 3, 4, which access the storage system through the fabric 8.

The process then activates a step 144, which identifies each fabric listed in a list of fabrics fab of the storage system, beginning with the first fabric on the list. This list is initially empty.

A step 145 tests whether a coupler PB_FC, to which the local coupler is physically connected, is a coupler of this fabric. In the fabric 8, this is the respective case with the coupler 11, 12, 21, 22, 31, 32, 41, 42 for the coupler 81, 86, 82, 87, 83, 88, 84, 89, respectively.

If the response in step 145 is yes, a step 146 adds the port FC to a list of ports of the fabric identified. Step 146 attaches the local coupler to the fabric identified, i.e., creates the object 112 with the identifier of this fabric as an attribute. The process is then finished.

If the response in step 145 is no, a step 147 tests whether the fabric identified is the last one on the list of fabrics.

If the response in step 147 is no, step 144 is reactivated for the next fabric on the list of fabrics.

If the response in step 147 is yes, a step 148 tests whether the local coupler corresponds to any port FC in a fabric.

If the return response in step 148 is no, a step 149 defines a new fabric added to the list of fabrics of the system and attaches the local coupler to it, i.e., creates the object 112 with the identifier of this fabric as an attribute. The process is then finished.

The object 112 then provides a list of connection objects corresponding to all the couplers connected to a loop or a fabric, which makes it possible, step by step, to access the remote couplers. The method 114 therefore makes it possible to construct any object 111, 113 corresponding to a remote coupler.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A network recognition system for identifying a storage unit of a network storage subsystem (5,6,7) of a machine (1) including at least one local coupler (11) for exchanging data with the storage subsystem (5,6,7), each storage subsystem (5,6,7) having at least one storage unit identifiable by a logical unit number, characterized in that an object (100) corresponding to the machine (1) comprises a first object (101) corresponding to the local coupler (11) of the machine (1), said first object (101) comprising a second object (111) corresponding to a remote coupler (51, 52) of one of the storage subsystems (5) and the first object (101) further includes a method (116) for obtaining the second object (111) and an object list (118, 119), each object of the list corresponding to a logical unit number (LUN) identifying a storage unit of the subsystem (5) accessible through the local coupler (11).

2. The system according to claim 1, wherein the method (116) is parameterized so as to mask one or more objects in the object list (118, 119).

3. A network recognition system for identifying a storage unit of a network storage subsystem (5,6,7) of a machine (4) including at least one local coupler (41) for exchanging data with the storage subsystem (5,6,7), each storage subsystem (5,6,7) having at least one storage unit identifiable by a logical unit number, characterized in that an object (100) corresponding to the machine (4) comprises a first object (101) corresponding to the local coupler (41) of the machine (4), said first object (101) comprising a second object (113) corresponding to a bridge (43) of the storage system and the first object (101) further comprises a method (117) for obtaining the second object (113) and an object list (120, 130), each object of the list corresponding to a logical unit number (LUN) identifying a storage unit of the storage subsystem accessible through the local coupler (41).

4. The system according to claim 1 wherein the second object (113) comprises a method (99) arranged to be parameterized to control supplying of the object list (120, 130).

5. The system according to claim 1, wherein the first object (101) comprises a building method (114) for building the second object (113) corresponding to a remote coupler by going through a list of connection objects (112).

6. The system according to claim 2 wherein the second object (113) comprises a method (99) arranged to be parameterized to control a supplying of the object list (120, 130).

7. The system according to claim 3 wherein the second object (113) comprises a method (99) arranged to be parameterized to control a supplying of the object list (120, 130).

8. The system according to claim 4 wherein the second object (113) comprises a method (99) arranged to be parameterized to control a supplying of the object list (120, 130).

9. A method for obtaining, for a machine (1,2,3,4), a virtual object (112) corresponding to a list of connection objects which in turn correspond to remote couplers connected to a fabric of a storage system, the list of connection objects enabling access to the remote couplers, the method comprising:

recognizing, during a configuration of the machine (1,2, 3,4), for each local coupler (11,12, 21, 22, 31,32,41,42) connected to the network, a recognized local coupler operating as a port FC; testing whether the recognized local coupler is connected to a private loop FCL;

creating, if the recognized local coupler is connected to a private loop FCL, a new virtual object L corresponding to the private loop, and creating a virtual object (112) with an identifier of the private loop as an attribute, thereby attaching the recognized local coupler to the private loop;

identifying, if the recognized local coupler is not connected to a private loop FCL, each fabric listed in a list of fabrics FAB of the storage system;

testing whether a coupler PB_FC, to which the recognized local coupler is physically connected, is a coupler of one of said list of fabrics FAB;

adding, if coupler PB_FC is a coupler of one of said list of fabrics FAB, the port FC to a list of ports of the identified fabric and creating the object (112) with the identifier of the identified fabric as an attribute, whereby the recognized local coupler is attached to the identified fabric;

testing, if coupler PB_FC is not a coupler of one of said list of fabrics FAB, whether the identified fabric is the last identified fabric on the list of fabrics testing, if the identified fabric is the last identified fabric, whether the recognized local coupler corresponds to any port FC in a fabric; and defining, if the recognized local coupler corresponds to any port FC in a fabric, a new fabric added to the list of fabrics of the system, and creating the object 112 with the identifier of the new fabric as an attribute, thereby attaching the recognized local coupler to the new fabric.

* * * * *

UNITED STATES PATENT AND TRADEMARK OFFICE
CERTIFICATE OF CORRECTION

PATENT NO. : 6,282,112 B1
DATED : August 28, 2001
INVENTOR(S) : Couvée et al.

It is certified that error appears in the above-identified patent and that said Letters Patent is hereby corrected as shown below:

<u>Column 8,</u>
Line 45, after "fabrics", insert -- FAB; --

Signed and Sealed this

Fourteenth Day of May, 2002

Attest:

*Attesting Officer*

JAMES E. ROGAN
*Director of the United States Patent and Trademark Office*